(No Model.) 2 Sheets—Sheet 1.
A. S. WILLIAMS.
CAR FENDER.
No. 547,312. Patented Oct. 1, 1895.
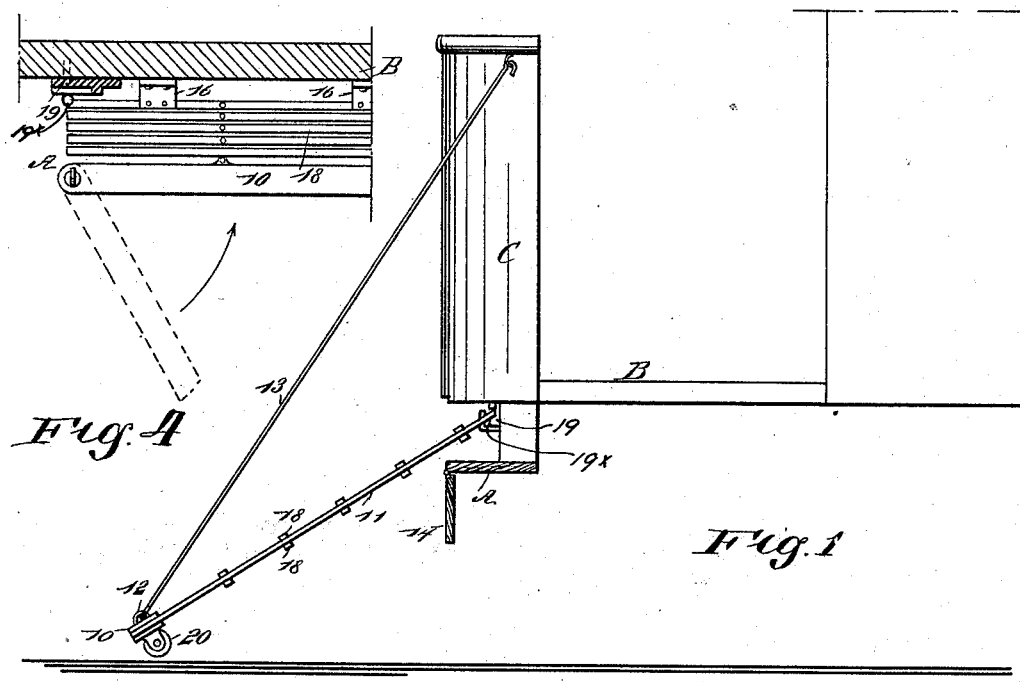
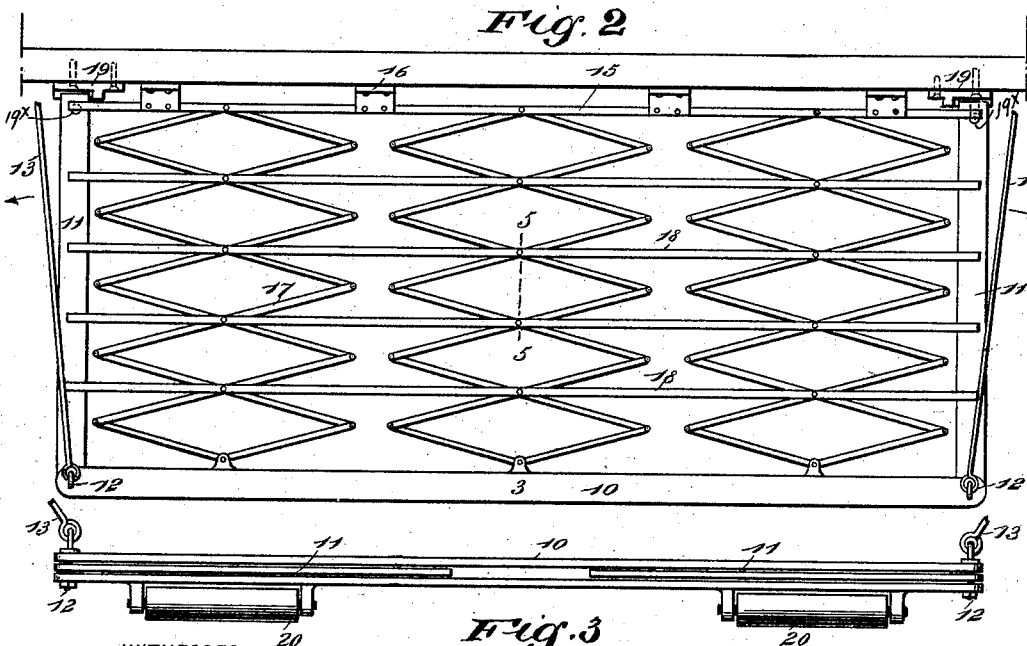
WITNESSES:
John Bergstrom
J. Fred Acker
INVENTOR
A. S. Williams
BY Munn & Co
ATTORNEYS.

(No Model.) 2 Sheets—Sheet 2.

A. S. WILLIAMS.
CAR FENDER.

No. 547,312. Patented Oct. 1, 1895.

WITNESSES:

INVENTOR
A. S. Williams
BY Munn & Co
ATTORNEYS.

UNITED STATES PATENT OFFICE.

ALEXANDER SCOTT WILLIAMS, OF LONG ISLAND CITY, NEW YORK.

CAR-FENDER.

SPECIFICATION forming part of Letters Patent No. 547,312, dated October 1, 1895.

Application filed October 12, 1894. Serial No. 625,674. (No model.)

*To all whom it may concern:*

Be it known that I, ALEXANDER SCOTT WILLIAMS, of Long Island City, in the county of Queens and State of New York, have invented a new and Improved Car-Fender, of which the following is a full, clear, and exact description.

My invention relates to an improvement in car-fenders, and it has for its object to construct a fender which will be light, durable, and economic, and one capable of being folded up beneath the platform of a car in such a manner as to occupy but little space, thereby enabling a fender to be placed as a factor at each end of a car, since when the fender is folded up in its upper position the car may be stored in the sheds as readily as if the fender were not applied.

A further object of the invention is to provide a fender which will extend outward and downward from the car-platform when in use within a short distance of the rails of the track and to locate rollers upon the lower portion of the fender, which are adapted to travel on the track when an object is picked up.

Another object of the invention is to provide a fender which will in no manner interfere with any apparatus that may be placed beneath the car or beneath the platform.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 6:
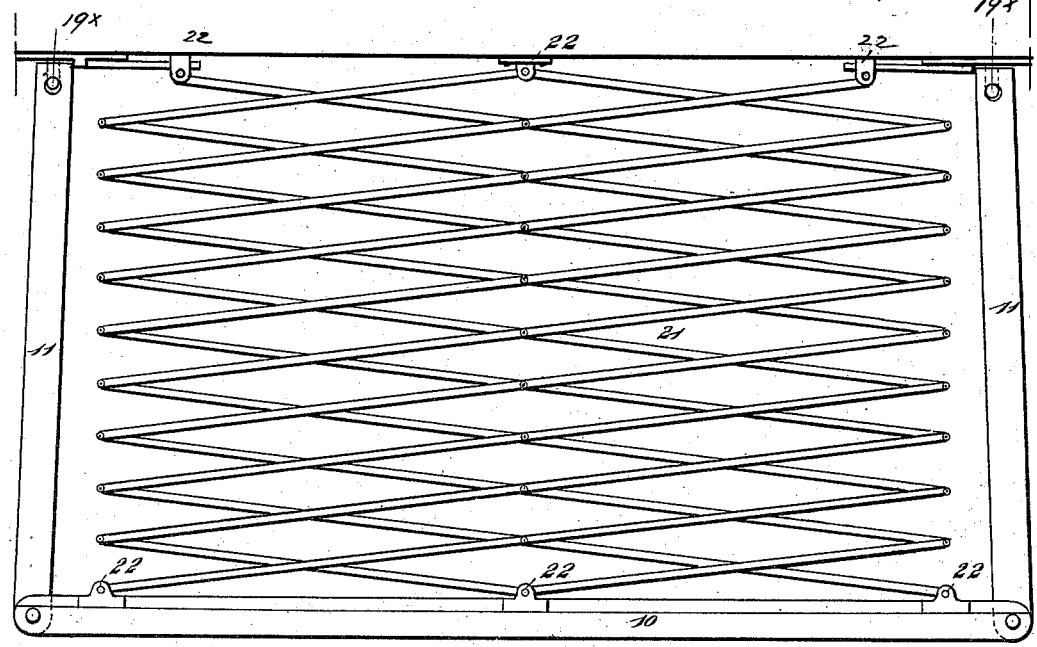
Figure 7:
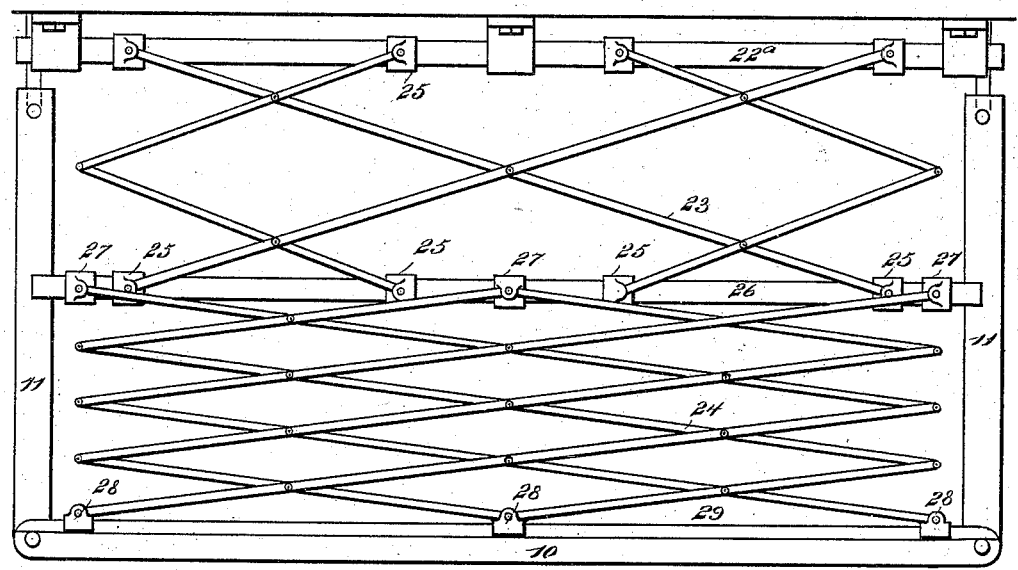

Figure 1 is a side elevation of a platform of a car, showing the fender likewise in side elevation and in position for use, the box in which the fender is to be folded being in section. Fig. 2 is a front elevation of the fender. Fig. 3 is a front view of the lower bar of the fender, showing the side portions of the frame folded in the said bar. Fig. 4 is a view of a portion of the fender, illustrating it as folded up in the storage-compartment provided therefor. Fig. 5 is a detail section taken substantially on the line 5 5 of Fig. 2. Fig. 6 is a front elevation of a slightly-modified form of the fender, and Fig. 7 is a similar view of a further modification.

In carrying out the invention the frame of the fender consists of a front bar 10, which is preferably a channel-bar, as shown in Fig. 3, and side bars 11, pivotally connected at their ends with the extremities of the front or channel bar 10, and if in practice it is found desirable the pivot-pin 12, connecting these portions of the frame, may be in the nature of an eyebolt, in order that a brace 13 may be attached to each bolt when the fender is in position on the car, and secured removably to the dashboard, as illustrated in Fig. 1; but it will be understood that the braces 13 are not necessary and may be omitted. A compartment A is constructed beneath the platform B of the car, preferably immediately under the dashboard C, as shown in Fig. 1, and the front of this compartment is provided with a door 14, preferably a drop-door. A bar 15 is secured within the compartment A through the medium of brackets 16 or their equivalents, being usually fastened to the rear wall of the same, and the bar 15, which is parallel with front or channel bar 10 of the frame, is connected with the latter through the medium of series of lazy-tongs 17, the series being in turn connected by cross-bars 18, located at the back and front of the fender in pairs, as shown in section in Fig. 5.

At or near each end of the inner cross-bar 15, or what may be termed the "stationary cross-bar" of the fender, a keeper 19 is permanently secured within the compartment A, and these keepers receive the free or inner ends of the side bars 11 of the fender-frame when the said fender is in position for use, and any form of catch may be employed to hold the side bars in said keepers if found necessary.

Under the construction of the fender above described it will be observed that the fender may be made exceedingly light and yet also very strong, as the cross-bars 18 connect the lazy-tongs, and any desired number of them may be used. It may here be remarked that the side bars 11 of the fender-frame when the fender is in use will enter between the cross-bars at their end portions.

The channel or front bar 10 of the fender-frame is provided with friction-rollers 20 upon its under face, as shown in Fig. 3, adapted to travel on the rails of a track, for example, when the fender is pressed down under a burden. When the car is to be placed in a shed, both of the fenders will be folded up in their compartments A, and when the car is running the rear fender only will be thus folded.

When a fender is folded in a compartment A and it is desired to bring the fender into action, the channel-bar is grasped and drawn downward and outward, bringing with it the body of the fender, the lazy-tongs unfolding until the fender is out to its full length. The side bars 11, which had been folded into the channel-bar 10, as shown in Fig. 3, will now be drawn outward and carried upward to form the sides of the frame, as shown in Fig. 2, their free ends being made to enter the keepers 19, and when the braces 13 are used they will be attached to the fender and to the dasher. In the drawings I have shown hooks $19^\times$, adapted to engage perforations formed in the ends of the side bars 11. In Fig. 4 I have shown in dotted lines one of the side bars as out of position at the sides of the fender proper and about to be placed in the channel-bar.

Under the construction of the fender shown in Fig. 6 the frame is of the same construction as that heretofore described; but the body of the fender consists of a single set of lazy-tongs 21, of the necessary width or of a width to extend practically from one side bar of the frame to the other when said side bars are in working position. Under this construction the series of lazy-tongs at the top is pivotally attached to the rear wall of the compartment A through the medium of brackets 22 or their equivalents, the attachment being made at the center and at the end portions of the tongs, a like connection being made between the bottom portion of the tongs and the front or channel bar 10 of the frame. The end brackets 22 are, of course, arranged to slide on suitable guides, as clearly seen. The fender, as constructed in Fig. 6, is folded upward within the compartment A and drawn out therefrom in like manner, as shown and described with reference to Figs. 1 to 4.

In Fig. 7 I have shown a further modification, the frame remaining of the same construction; but the cross-bar $22^a$ is secured in the compartment A, and the body of the fender comprises two sets of lazy-tongs, an upper set 23 and a lower set 24. The members of these tongs are pivoted wherever they cross. Consequently the upper and lower ends of the members of set 23 are provided with sockets or sleeves 25, the upper sockets or sleeves of the upper set of tongs being held to slide on the top bar $22^a$, and the lower sleeves of the upper set being adapted to slide upon an intermediate cross-bar 26. The lower set of lazy-tongs 24 is provided with sleeves 27 at the upper extremities of their members, which also slide on the intermediate bar 26, while sockets 28 are formed upon the lower or forward portions of the lower set of tongs, and said sockets have sliding movement on a rail 29, formed upon the front or channel-bar 10 of the frame. Under this latter construction both sets of lazy-tongs will fold when the fender is placed in the compartment A, while the intermediate bar 26 will be carried upward and assume a parallel position to the uppermost bar $22^a$.

Having thus described my invention, I claim as new and desire to secure by Letters Patent—

1. A car fender, having its body composed of a lazy-tongs structure adapted to be distended and collapsed and means connected to the forward end of said structure for holding the same in its distended position, substantially as set forth.

2. A car fender having its body composed of rods or bars hinged together to form a lazy-tongs structure adapted to be collapsed and distended and means independent of said lazy-tong structure for holding said structure in its distended position substantially as set forth.

3. A car fender having its body composed of rods or bars hinged together to form a lazy-tongs structure adapted to be collapsed and distended, a front bar secured to the forward edge of said lazy-tong structure and means for supporting said front bar from the car whereby the fender is maintained in position when distended, substantially as set forth.

4. A car fender, the same consisting of a body formed of lazy-tongs, means, substantially as described, for attaching one portion of the tongs to a car, and a frame having one of its members attached to the said tongs, opposite their point of attachment to the car, the other members of the frame being capable of folding in or upon the attached member, as and for the purpose specified.

5. A car fender, the same comprising a body constructed of lazy-tongs, means, substantially as described, for attaching the lazy-tongs to a car, and a frame comprising a front bar attached to the lazy-tongs, side bars pivoted to the front bar, their opposite ends being free, and keepers for the free ends of the side bars, as and for the purpose specified.

ALEXANDER SCOTT WILLIAMS.

Witnesses:
J. FRED. ACKER,
JNO. M. RITTER.